United States Patent [19]

Suzuki et al.

[11] 4,245,062

[45] Jan. 13, 1981

[54] PROCESS FOR PRODUCING PROPYLENE-ETHYLENE COPOLYMERS

[75] Inventors: Takeshi Suzuki; Hiromasa Chiba; Ryohichi Yasunaga; Hironaka Sekine, all of Ichiharashi, Japan

[73] Assignee: Chisso Corporation, Osaka, Japan

[21] Appl. No.: 74,437

[22] Filed: Sep. 11, 1979

[30] Foreign Application Priority Data

Sep. 22, 1978 [JP] Japan .................................. 53-117107

[51] Int. Cl.$^3$ ............................................ C08L 23/16
[52] U.S. Cl. .................................... 525/323; 525/245; 525/240
[58] Field of Search ................................ 525/323, 240

[56] References Cited

U.S. PATENT DOCUMENTS 3,480,696   11/1969   Hassell et al. ........................ 525/323
3,670,053   6/1972    Sennari et al. ....................... 525/323

FOREIGN PATENT DOCUMENTS 52-8094   1/1977   Japan .

Primary Examiner—Carman J. Seccuro
Attorney, Agent, or Firm—Fred Philpitt

[57] ABSTRACT

A process for producing a modified polypropylene by copolymerizing propylene with ethylene in the presence of a Ziegler-Natta catalyst is provided.

This process consists of the following three steps:

a first step of carrying out polymerization so as to give a propylene polymer corresponding to 75–90% by weight based on a final modified polypropylene and having an ethylene content of 2% by weight or lower, a second step of preparing an ethylene-propylene random copolymer (A) having an intrinsic viscosity of 12 dl/g or higher and an ethylene content of 50–95% by weight; and a third step of preparing an ethylene-propylene random copolymer (B) having an intrinsic viscosity of 9.5 dl/g or lower and an ethylene content of 40–90% by weight, the proportion of said (A) in the total amount of said (A) and (B) being adjusted to 4–30% by weight. In this process, it is possible to prepare said (B) in the second step and then prepare said (A) in the third step.

The resulting copolymer product has improved low-temperature impact strength, high brittle temperature and melt flow characteristics along with stiffness and luster of polypropylene.

5 Claims, No Drawings

PROCESS FOR PRODUCING PROPYLENE-ETHYLENE COPOLYMERS

DESCRIPTION OF THE INVENTION

The present invention relates to a process for producing a modified propylene copolymer by copolymerizing propylene with ethylene in a specified manner. More particularly it relates to a process for producing a modified propylene copolymer which has a high low-temperature-impact strength even at temperatures of 10° C.–0° C. or lower; a low brittle temperature; a small reduction in the luster of the molded articles brought by fine concaves and convexes on their surface; improved properties relative to fluidity of molten polymer at the time of molding; a large stiffness; and balanced qualities.

Production of polymers from propylene by the use of stereospecific catalysts has been generally carried out on a commercial scale, and polypropylene has been used as a multi-purpose resin in various application fields. Depending on specific features, polypropylene has, on one hand, common application fields to those of polyethylene, but, on the other hand, different application fields from those of polyethylene.

Highly crystalline polymers obtained as α-olefin polymers from propylene exhibit a relatively high melting point, hardness and tensile strength, but on the other hand, a high brittle temperature and a low impact strength. On the other hand, polymers obtained from ethylene can be used in the fields where a low brittle temperature is required, but is disadvantageous in the flexibility and resistance to boiling water as compared with polypropylene.

For improving the impact strength and low-temperature brittleness of crystalline polypropylene, for example, if an elastomer represented by EPR is employed, there are drawbacks of reductions in the weld strength, luster and stiffness.

For improving the low-temperature brittleness of crystalline polypropylene, a method of random- or block-copolymerizing propylene with another olefin e.g. with ethylene is known. However, in case of a random copolymer of propylene and ethylene, the improvement of the low-temperature brittleness is insufficient, and moreover, a rapid reduction in the tensile strength is observed. On the other hand, in case of a block copolymer, a copolymer in which ethylene content is increased in order to improve the low-temperature impact strength is degraded in stiffness and transparency compared with polypropylene, and operation of the process becomes much more difficult due to the influence of amorphous polymer. Further, if the molecular weight of the ethylene-propylene random copolymer portion is increased for improving the low-temperature impact strength of the copolymer, it is observed that the luster of the appearance of molded articles prepared from the resulting polymer is much reduced as compared with that of propylene homopolymer.

In view of the foregoing, for improving the qualities of propylene polymers containing ethylene, a three stage block copolymerization has been attempted. For example, Japanese Patent Publication No. 20621/1969 discloses a method of producing a propylene/ethylene block copolymer having a superior impact strength at lower temperatures, with a high yield, by increasing the ethylene contents in the block segments of the respective copolymers at each step of three step copolymerizations, from the first step to the second and from the second step to the third in this order, and simultaneously decreasing the constituting proportions of the respective block segments, from the first step to the second and from the second step to the third in this order, in order to prevent an amorphous polymer which is soluble in polymerization solvents, from being formed in a large amount as a byproduct, and also to prevent the crystallinity of block copolymer from being notably reduced. Further, Japanese Patent Publication No. 24593/1974 discloses a method for producing a block copolymer having a less blanching degree when impact or bending is applied, by using two step polymerizations, after forming a propylene homopolymer, and making the reaction ratio of ethylene to propylene as well as the amount of ethylene reacted, larger than those in the first step. Furthermore, Japanese Patent Application Laid-Open No. 8094/1977 discloses a method of producing a polymer having qualities such as those which are obtained in the case of batchwise copolymerization, even in a continuous manner, with a superior reproducibility, by carrying out the second step substantially in the absence of hydrogen, and increasing the reaction ratio of ethylene to propylene as copolymerization advances toward the latter step, whereby a block copolymer having a high impact strength and a high stiffness is obtained.

In such a situation, the present inventors now propose a novel method of a block copolymerization consisting of three steps. The present invention has an object of providing a process for producing a crystalline propylene copolymer in which the low-temperature impact strength and the high brittle temperature which are the drawbacks of crystalline polypropylene are greatly improved, without damaging the stiffness, luster, etc. of crystalline polypropylene which are its specific features, and also its melt flow characteristics are improved to improve its moldability and the dimensional stability of molded articles, and a propylene copolymer having balanced properties can be produced with a good efficiency.

According to the present invention, a propylene-ethylene block copolymerization is carried out in three steps, and its gist resides in:

A process for producing a modified polypropylene having an ethylene content of 5 to 20% by weight, by copolymerizing propylene with ethylene in the presence of a stereospecific catalyst comprising an organoaluminum compound component and a transition metal halide component,
which process is characterized by three steps:
- a first step of carrying out polymerization so as to give a propylene polymer corresponding to 75 to 90% by weight based on the weight of a final modified polypropylene and having an ethylene content of 2% by weight or less;
- a second step of preparing an ethylene-propylene random copolymer (A) having an intrinsic viscosity of 12 dl/g or higher as measured in tetralin at 135° C. and an ethylene content of 50 to 95% by weight; and
- a third step of preparing an ethylene-propylene random copolymer (B) having an intrinsic viscosity of 9.5 dl/g or lower as measured in tetralin at 135° C., which is different from that of said ethylene-propylene random copolymer (A), and an ethylene content of 40 to 90% by weight, the proportion of said ethylene-propylene random copolymer (A) in the total amount of said ethylene-propylene random copolymers (A) and (B) being adjusted to 4 to 30% by weight and the first step being carried out always at first but the order of the second step and the third step being interexchangeable.

The present invention has been made based on the finding that if the respective intrinsic viscosities of the random copolymers at the time of two step random copolymerizations carried out successively to a substantial homopolymerization of propylene are regulated to specific values, a copolymer having preferable physical properties to those of copolymers obtained according to conventional processes wherein the ethylene content in random copolymers or the proportion of random copolymers formed is varied.

The process for producing copolymers, of the present invention will be now described in more detail.

As described above, according to the present invention, copolymers are produced in three steps wherein a propylene polymer having an ethylene content of 2% by weight or lower is prepared in the first step, and in succession to this first stage, ethylene-propylene random copolymers are prepared in two steps.

In the first step of the present invention, a propylene homopolymer or a propylene-ethylene copolymer having an ethylene content of 2% by weight or lower is prepared. As to the quantitative proportion of the polymer prepared in the first step, it is important that the proportion be regulated to 75-90% by weight based on the weight of the polymer finally obtained in the present invention. The molecular weight of the polymer prepared in the first step can be optionally controlled e.g. by means of hydrogen gas, and usually it is regulated to a melt flow rate (abbreviated hereinafter to MFR) of 0.5 to 100. If ethylene is also used as a monomer for polymerization, even when ethylene is fed either continuously or intermittently, the same result is obtained. If the ethylene content in the polymer prepared in the first step exceeds 2% by weight, the stiffness of the finally obtained polymer is greatly reduced.

In the second and third steps successive to the first step of the present invention, ethylene-propylene random copolymers are prepared so as to give a first specified ethylene content, a specified ethylene content in the finally obtained block copolymer, a specified proportion of two kinds of random copolymers in the total amount of these two, and besides, specified relationships of intrinsic viscosities obtained by calculation according to the following equations:

When the intrinsic viscosity of the polymer obtained at the time of completion of the first step polymerization is named $[\eta]_1$ as a basis, and the respective intrinsic viscosities of the block copolymers of the polymer and the random copolymers obtained at the time of completions of the second and third step copolymerizations are named $[\eta]_{1+2}$ and $[\eta]_{1+2+3}$, the respective copolymerizations are carried out determining the values of $[\eta]_2$ and $[\eta]_3$ shown by the relationships $$(W_1 + W_2)[\eta]_{1+2} = W_1[\eta]_1 + W_2[\eta]_2$$

$$(W_1 + W_2 + W_3)[\eta]_{1+2+3} = W_1[\eta]_1 + W_2[\eta]_2 + W_3[\eta]_3$$

$$W_1 + W_2 + W_3 = 1$$

In the above equations, $W_1$, $W_2$ and $W_3$ represent the proportion by weight of the polymer or copolymers insoluble in the polymerization solvent, prepared in the first, second and third steps, in the finally prepared copolymer insoluble in the polymerization solvent, respectively. $[\eta]_2$ and $[\eta]_3$ represent a calculated value obtained with the copolymers prepared in the second and third steps, respectively. Namely, the $[\eta]_2$ and $[\eta]_3$ employed in the present invention are not employed in the same meaning as in the equation $[\eta] = KM^a$ (wherein K and a represent constants, respectively, and M represents the molecular weight of a high molecular weight substance) usually employed for determining the molecular weight of polymer, but employed as a guideline at the time of the copolymerizations.

The intrinsic viscosity (as measured in tetralin at 135° C.; unit, dl/g; the viscosity will be hereinafter abbreviated to $[\eta]$) of the random copolymer prepared in the second step (or the third step) is the one calculated for the polymer obtained at the time of completion of the step and insoluble in the polymerization solvent, and since preparation of a high molecular weight copolymer is necessary in this copolymerization in view of low-temperature characteristics and flow characteristics at the time of processing, the polymerization process should be regulated so as to give a predetermined $[\eta]$, in the absence of hydrogen which is generally employed for molecular weight adjustment, or in the presence of a small amount of hydrogen added to the monomer for the copolymerization. Particularly when the copolymer is prepared without employing hydrogen, the finally obtained polymer exhibits a superior low-temperature impact strength. The ethylene content in the ethylene-propylene random copolymer obtained in this step is preferable to be 50 to 95% by weight, particularly 70 to 90% by weight, in view of the low-temperature impact strength. The increment of the weight of the copolymer obtained in this step is preferably in the range of 4–30% by weight, particularly 8–25 by weight, based on the total sum of this increment and the increment of the weight of the copolymer obtained in the next step. If it is lower than 4% by weight, the low-temperature impact strength of the finally obtained polymer is not improved so much. If it exceeds 30% by weight, the improvement in the luster of molded articles is insufficient in case where the copolymer (A) is prepared in the second step and the copolymer (B) is prepared at the third step, although the luster is improved in case where the copolymer (B) is prepared at the second step and the copolymer (A) is prepared at the third step.

In the third step (or the second step), the copolymerization is regulated so as to give a $[\eta]$ of the ethylene-propylene random copolymer of 9.5 or lower, preferably 9.0 or lower, in respect of luster. If the $[\eta]$ exceeds 9.5, the improvement in the luster of molded articles is insufficient. It is preferable for the copolymer obtained in this step to have an ethylene content of 40–90% by weight, particularly 50–85% by weight. If the content is lower than or exceeds the former range, the improvement in the low-temperature impact strength of the finally obtained polymer is insufficient. On the other hand, in the points of spiral flow and luster, it is advantageous to carry out the copolymerization so as to give values of $[\eta]_2$ and $[\eta]_3$ greatly different from each other.

The ethylene content in the whole of the polymer finally obtained according to the present invention is preferably 5 to 20% by weight, particularly 8–15% by weight. If it is lower than 5% by weight, the improvement in the low-temperature impact strength is insufficient, and if it exceeds 20% by weight, the stiffness is reduced.

As described above, in the ethylene-propylene random copolymerization of the present invention, in place of preparing the copolymer (A) in the second step and then preparing the copolymer (B) in the third step, it is possible to prepare the copolymer (B) in the second step and then prepared the copolymer (A) in the third step. However, in the point of improving the low-temperature impact strength of the finally obtained polymer, the former process ((A)→(B)) is preferable.

As for the stereospecific catalyst employed throughout the polymerization and copolymerization of the present invention, those comprising an organosluminum component and a transition metal halide component, that is, so-called Ziegler catalysts employed for producing isotactic polypropylene are employed. For example, a combination of an alkylaluminum or alkylaluminum halide with titanium trichloride is mentioned as basis. As for titanium trichloride, those obtained by reducing titanium tetrachloride with metallic titanium or hydrogen, those obtained by reducing titanium tetrachloride with metallic aluminum or by further milling the resulting reduced substance, those obtained by reducing titanium tetrachloride with an organometal compound such as an organoaluminum compound, etc. can be employed. Further, those obtained by treating the thus obtained titanium trichloride (or its composition) with an electron donor compound such as ethers, ketones, esters, silicon compounds, nitrogen compounds, etc. can be also employed. Furthermore, reaction products of titanium tetrachloride with magnesium complex compounds can be also employed. As for the organoaluminum compound, those expressed by the general formula $AlR_nX_{3-n}$ (wherein R represents an alkyl group of 1 to 8 carbon atoms, n represents an integer of 1 to 3 and X represents a halogen atom), and for example, dimethylaluminum chloride, diethylaluminum chloride, diethylaluminum iodide, ethylaluminum sesquichloride, triethylaluminum, etc. are mentioned. These compounds may be employed alone or in admixture.

As for the polymerization of the present invention, any one of slurry polymerization employing an inert solvent such as propane, hexane, heptane, etc., bulk polymerization carried out in propylene monomer, gas phase polymerization, etc. are feasible. In the ethylene-propylene random copolymerization in the second and third steps of the present invention, polymerization in an inert solvent or gas phase polymerization is preferable in the point of easiness of controlling the composition of the random copolymer.

The temperature at which the polymerization or copolymerization in the first step of the present invention is carried out is preferably in the range of room temperature to 90° C., and the pressure in the polymerization or copolymerization is in the usually employed range of 0 to 40 kg/cm$^2$.G. The polymerization time is preferably in the range of 30 minutes to 10 hours. The temperatures at which the ethylene-propylene copolymerizations in the second and third steps of the present invention are carried out, are preferably in the range of 40° to 65° C. If they exceed 65° C., there is a tendency that a polymer soluble in the polymerization solvent is formed in a large amount, and if they are lower than 40° C., heat conduction for removing the polymerization heat becomes difficult and the polymerization rate is reduced. The polymerization pressure and time are preferably in the ranges of 0 to 40 kg/cm$^2$.G and one minute to 7 hours, respectively.

The present invention will be further illustrated below by way of Examples and Comparative examples.

EXAMPLE 1

Into a 50l capacity polymerization vessel purged with nitrogen gas, was introduced 20l of n-hexane, and there were added 4 g of a titanium trichloride composition obtained by mixing 8 g of diethylaluminum monochloride and 4 g of a titanium trichloride composition obtained by mixing a so-called A type titanium trichloride (a product obtained by reducing titanium tetrachloride with metallic aluminum) with a reaction product of titanium tetrachloride with ethyl ether, followed by milling. Further, hydrogen was added and the temperature was maintained at 70° C. Propylene was then fed to the polymerization vessel, and polymerization was carried out under a pressure inside the polymerization vessel, of 10 kg/cm$^2$.G at 70° C. When the amount of propylene polymerized reached 5 kg, feed of propylene was stopped, and unreacted propylene was purged, followed by maintaining the inside of the polymerization vessel at 60° C. under 0.1 kg/cm$^2$.G. Copolymerization in the second step was then carried out by feeding no hydrogen gas or a small amount of hydrogen gas to the polymerization vessel and successively a gas mixture of ethylene with propylene, followed by purging unreacted monomers. Copolymerization in the third stage was then carried out by feeding hydrogen gas to the polymerization vessel while maintaining the inside thereof at a temperature of 60° C. under a pressure of 0 kg/cm$^2$.G, and thereafter feeding a gas mixture of ethylene with propylene while maintaining the pressure inside the vessel at 2 kg/cm$^2$.G, followed by purging unreacted monomers. One liter of isobutyl alcohol was then added and stirring was carried out at a temperature of 75° C. for 30 minutes, followed by adding 50 ml of a 20% NaOH aqueous solution and stirring for 20 minutes. Five liters of water were added and water-washing and separation were twice repeated to give a slurry, which was then filtered and dried to obtain a copolymer of white powder. The results of analysis of the polymer and measurement of its physical properties are shown in Table 1.

Comparative example 1

In this example, the polymerization in the first step was carried out in the same manner as in Example 1, but the copolymerization in the second step was carried out for a longer time than that of Example 1 and the copolymerization in the third step was not carried out. The results are shown in Table 1.

Comparative example 2

A copolymer was obtained under the same conditions as in Example 1 except that the [η] of the copolymer obtained in the second step copolymerization was made lower than the values in the range of the present invention. The results are shown in Table 1.

TABLE 1

| | | | Three-step polymerization | | | |
|---|---|---|---|---|---|---|
| | | | Example 1 | Example 1-2 | Example 1-3 | Example 1-4 |
| Second step copolymerization | Amount of hydrogen fed | l | 0 | 0 | 0.6 | 1.3 |
| | Ethylene/total monomer (1) | Weight % | 70 | 70 | 70 | 70 |
| | Pressure | Kg/cm². G | 2 | 2 | 2 | 2 |
| | Polymerization time | min. | 10 | 5 | 15 | 10 |
| Third step copolymerization | Amount of hydrogen fed | l | 3.5 | 3.0 | 2.8 | 3.0 |
| | Ethylene/total monomer (1) | Weight % | 45 | 47 | 47 | 47 |
| | Polymerization time | min. | 110 | 115 | 105 | 110 |
| Intrinsic viscosity (calculated value) | $[\eta]_1$ | dl/g | 1.54 | 1.41 | 1.32 | 1.44 |
| | $[\eta]_2$ | " | 19.6 | 16.2 | 13.0 | 12.1 |
| | $[\eta]_3$ | " | 7.2 | 8.2 | 9.3 | 8.3 |
| Ethylene content in copolymer formed in each step (2) | Second step | Weight % | 82 | 78 | 81 | 78 |
| | Third step | " | 65 | 67 | 67 | 67 |
| Finally obtained copolymer | Weight ratio of polymers formed in each step | | 83/2/15 | 85/1/14 | 83/3/14 | 82/2/16 |
| | Ethylene content in total polymer (2) | Weight % | 11.4 | 10.2 | 11.8 | 12.3 |
| | MFR of polymer (3) | g/10 min. | 7.5 | 6.8 | 7.2 | 5.8 |
| | Soluble polymer (4) | Weight % | 4.3 | 4.8 | 4.5 | 4.7 |
| Values of physical properties | I I (23° C.) (5) | Kg . cm/cm² | 13.5 | 12.8 | 13.1 | 13.8 |
| | I I (−20° C.) | " | 8.3 | 8.0 | 7.5 | 7.7 |
| | Brittle temperature (6) | °C. | −18 | −16 | −13 | −10 |
| | Luster (7) | % | 78 | 79 | 68 | 77 |
| | Hardness (8) | R-scale | 92 | 94 | 92 | 93 |
| | Bending modulus (9) | ×10⁴Kg/cm² | 1.25 | 1.25 | 1.25 | 1.25 |
| | Tensile strength (10) | Kg/cm² | 285 | 285 | 285 | 285 |
| | Spiral flow (11) | mm | 110 | 101 | 95 | 95 |

| | | | Two-step polymerization | | | Three-Step polymerization (low η2) | | |
|---|---|---|---|---|---|---|---|---|
| | | | Comp. ex. 1-1' | Comp. ex. 1-2' | Comp. ex. 1-3' | Comp. ex. 2-1' | Comp. ex. 2-2' | Comp. ex. 2-3' |
| Second step copolymerization | Amount of hydrogen fed | l | 0.8 | 1.5 | 3.5 | 5.0 | 2.4 | 1.5 |
| | Ethylene/total monomer (1) | Weight % | 47 | 47 | 47 | 70 | 70 | 70 |
| | Pressure | Kg/cm². G | 2 | 2 | 2.5 | 2 | 2 | 2 |
| | Polymerization time | min. | 120 | 120 | 120 | 15 | 10 | 10 |
| Third step copolymerization | Amount of hydrogen fed | l | | | | 3.0 | 3.0 | 3.0 |
| | Ethylene/total monomer (1) | Weight % | | | | 45 | 47 | 47 |
| | Polymerization time | min. | | | | 105 | 110 | 110 |
| Intrinsic viscosity (calculated value) | $[\eta]_1$ | dl/g | 0.98 | 1.15 | 1.53 | 1.45 | 1.43 | 1.46 |
| | $[\eta]_2$ | " | 12.9 | 10.8 | 6.0 | 4.5 | 9.0 | 10.8 |
| | $[\eta]_3$ | " | | | | 7.0 | 6.5 | 8.7 |
| Ethylene content in copolymer formed in each step (2) | Second step | Weight % | 70 | 68 | 71 | 81 | 80 | 79 |
| | Third step | " | | | | 64 | 68 | 65 |
| Finally obtained copolymer | Weight ratio of polymers formed in each step | | 83/17 | 84/16 | 80/20 | 82/3/15 | 82/2/16 | 82/2/16 |
| | Ethylene content in total polymer (2) | Weight % | 11.9 | 10.9 | 14.2 | 12.0 | 11.5 | 12.0 |
| | MFR of total polymer (3) | g/10 min. | 7.4 | 7.2 | 6.5 | 7.0 | 6.8 | 7.5 |
| | Soluble polymer (4) | Weight % | 4.6 | 4.1 | 7.5 | 5.6 | 5.0 | 4.4 |
| | I I (23° C.) (5) | Kg . cm/cm² | 12.5 | 10.6 | 12.7 | 9.2 | 8.5 | 12.3 |
| | I I (−20° C.) | " | 6.1 | 5.8 | 7.4 | 5.4 | 5.2 | 6.4 |
| Values of physical properties | Brittle temperature (6) | ° C. | −14 | −10 | −7 | −2 | −3 | −6 |
| | Luster (7) | % | 51 | 60 | 75 | 78 | 78 | 75 |
| | Hardness (8) | R-scale | 91 | 94 | 83 | 90 | 93 | 93 |
| | Bending modulus (9) | ×10⁴Kg/cm² | 1.25 | 1.20 | 1.05 | 1.20 | 1.25 | 1.25 |
| | Tensile strength (10) | Kg/cm² | 275 | 280 | 260 | 285 | 280 | 285 |
| | Spiral flow (11) | mm | 90 | 88 | 85 | 89 | 88 | 90 |

Explanation of items in Tables
(The meanings of the terms in Tables 2, 3 and 4 are the same as those in Table 1.)
(1) Ratio by weight of mixed monomers fed to the polymerization vessel
(2) According to IR method
(3) ASTM D-1238 (230° C.,2.16 Kg)
(4) Ratio by weight of (polymer dissolved in polymerization solvent)/(polymer insoluble in polymerization solvent + polymer dissolved in polymerization solvent)
(5) Izod impact strength, JISK-7110
(6) ASTM D-746
(7) ASTM D-523
(8) JIS K-7202
(9) JIS K-7203
(10) JIS K-7113
(11) Injection temperature 240° C.; injection pressure 40 Kg/cm². G; spiral mold 50° C.

According to the results shown in Table 1, Comparative examples 1-1' and 1-2' were inferior to Example 1 in the luster and low-temperature impact strength. Comparative example 1-3' had a larger amount of a soluble polymer formed, than Example 1 and was inferior to Example 1 in the stiffness. Comparative example 2 was not inferior to Example 1 in the luster, but inferior to Example 1 in the impact strength at −20° C. and the brittle temperature and further, the spiral flow (a guideline for melt flow characteristics at the time of processing), which was caused by a copolymerization wherein the operation of making $[\eta]_2$ lower was carried out although the ratio of ethylene to total monomers was the same as that in Example 1.

With regard to the above-mentioned limitation that the increment of the weight of the copolymer obtained in the second step (or the third step) is in the range of 4–30% by weight based on the total of this increment and the increment of the weight of the copolymer obtained in the next step:

For example, in Example 1–1 of Table 1, the item of "Weight ratio of polymers formed in each step" in "Finally obtained copolymer", the former increment corresponds to "2" and the latter increment corresponds to "15". 2/(2+15)=11.8%. This value is within the above range of 4–30% by weight.

EXAMPLE 2 and Comparative example 3

Copolymers were obtained under the same conditions as in Example 1 except that the ratios by weight of the copolymers prepared in the second and third steps were varied from that in Example 1. The results are shown in Table 2.

EXAMPLE 3 and Comparative example 4

Copolymers were obtained under the same conditions as in Example 1 except that the ethylene contents in the copolymers prepared in the second step were varied from that of Example 1. The results are shown in Table 2.

Comparative example 5

Copolymers were obtained under the same conditions as in Example 1 except that the calculated values $[\eta]_3$ of the intrinsic viscosities of the copolymers prepared in the third step were varied. The results are shown in Table 2.

TABLE 2

| | | | Second step/third step polymer ratio | | | |
|---|---|---|---|---|---|---|
| | | | Example 2-1 | Example 2-2 | Comp. ex. 3-1' | Comp. ex. 3-2' |
| Second step copolymerization | Amount of hydrogen fed | l | 0 | 0 | 0 | 0 |
| | Ethylene/total monomer (1) | Weight % | 70 | 70 | 70 | 70 |
| | Pressure | Kg/cm². G | 2 | 3 | 2 | 2 |
| | Polymerization time | min. | 10 | 10 | 5 | 50 |
| Third step copolymerization | Amount of hydrogen fed | l | 2.8 | 2.8 | 3.8 | 3.5 |
| | Ethylene/total monomer (1) | Weight % | 45 | 45 | 45 | 45 |
| | Polymerization time | min. | 110 | 110 | 115 | 70 |
| Intrinsic viscosity (calculated value) | $[\eta]_1$ | dl/g | 1.85 | 1.82 | 2.10 | 1.90 |
| | $[\eta]_2$ | " | 22.8 | 25.7 | 18.3 | 17.3 |
| | $[\eta]_3$ | " | 9.0 | 9.1 | 6.7 | 7.6 |
| Ethylene content in copolymer formed in each step (2) | Second step | Weight % | 81 | 80 | 78 | 81 |
| | Third step | " | 71 | 69 | 68 | 67 |
| Finally obtained copolymer | Weight ratio of polymers formed in each step | | 85/2.5/12.5 | 85/3.5/11.5 | 83/0.5/16.5 | 81/7.5/10.5 |
| | Ethylene content in total polymer (2) | Weight % | 10.9 | 10.7 | 11.6 | 1301 |
| | MFR of total polymer (3) | g/10 min. | 2.6 | 2.3 | 2.5 | 2.3 |
| | I I (23° C.) (5) | Kg . cm/cm² | 21.3 | 19.7 | 14.0 | 18.9 |
| | I I (−20° C.) | " | 10.4 | 9.6 | 7.1 | 9.4 |
| Values of physical properties | Brittle temperature (6) | °C. | −25 | −27 | −15 | −25 |
| | Luster (7) | % | 70 | 65 | 76 | 54 |
| | Hardness (8) | R-scale | 93 | 94 | 90 | 91 |
| | Bending modulus (9) | ×10⁴Kg/cm² | 1.25 | 1.25 | 1.25 | 1.20 |
| | Tensile strength (10) | Kg/cm² | 285 | 285 | 280 | 275 |
| | Spiral flow (11) | mm | 85 | 80 | 65 | 70 |

| | | | Ethylene content in second step | | | | |
|---|---|---|---|---|---|---|---|
| | | | Example 3- | Example 3-2 | Example 3-3 | Comp. ex. 4-1' | Comp. ex. 4-2' |
| Second step copolymerization | Amount of hydrogen fed | l | 0 | 0 | 0 | 0 | 0 |
| | Ethylene/total monomer (1) | Weight % | 78 | 45 | 25 | 85 | 15 |
| | Pressure | Kg/cm². G | 2 | 2 | 2 | 2 | 2 |
| | Polymerization time | min. | 10 | 10 | 15 | 10 | 15 |
| Third step copolymerization | Amount of hydrogen fed | l | 4.0 | 2.9 | 3.0 | 4.0 | 4.0 |
| | Ethylene/total monomer (1) | Weight % | 45 | 45 | 45 | 45 | 47 |
| | Polymerization time | min. | 110 | 110 | 110 | 110 | 105 |
| Intrinsic viscosity (calculated value) | $[\eta]_1$ | dl/g | 1.56 | 1.40 | 1.47 | 1.62 | 1.50 |
| | $[\eta]_2$ | " | 19.4 | 18.6 | 15.7 | 19.7 | 13.5 |
| | $[\eta]_3$ | " | 6.2 | 8.8 | 6.1 | 5.8 | 5.8 |
| Ethylene content in copolymer formed in each step (2) | Second step | Weight % | 90 | 65 | 55 | 98 | 40 |
| | Third step | " | 65 | 63 | 65 | 65 | 68 |
| Finally obtained copolymer | Weight ratio of polymers formed in each step | | 85/2/13 | 85/2/13 | 85/2/13 | 84/2/14 | 83/3/14 |
| | Ethylene content in total polymer (2) | Weight % | 10.3 | 9.5 | 9.6 | 11.1 | 10.7 |
| | MFR of total polymer (3) | g/10 min. | 6.5 | 7.5 | 6.8 | 6.3 | 7.2 |

TABLE 2-continued

| | | | | | | | |
|---|---|---|---|---|---|---|---|
| | I I (23° C.) (5) | Kg . cm/cm² | 11.7 | 12.6 | 12.5 | 9.5 | 11.8 |
| | I I (−20° C.) | " | 7.0 | 8.4 | 8.3 | 6.3 | 5.7 |
| Values of | Brittle temperature (6) | °C. | −12 | −15 | −13 | −6 | −4 |
| physical | Luster (7) | % | 75 | 72 | 78 | 73 | 75 |
| properties | Hardness (8) | R-scale | 93 | 90 | 90 | 95 | 90 |
| | Bending modulus (9) | ×10⁴Kg/cm² | 1.20 | 1.30 | 1.20 | 1.20 | 1.20 |
| | Tensile strength (10) | Kg/cm² | 280 | 285 | 280 | 280 | 280 |
| | Spiral flow (11) | mm | 98 | 102 | 95 | 94 | 89 |

| | | | | $\eta_3$ | |
|---|---|---|---|---|---|
| | | | | Comp. ex. 5-1' | Comp. ex. 5-2' |
| Second step copolymerization | Amount of hydrogen fed | l | | 0.1 | 0 |
| | Ethylene/total monomer (1) | Weight % | | 70 | 50 |
| | Pressure | Kg/cm² . G | | 2 | 2 |
| | Polymerization time | min. | | 10 | 10 |
| Third step copolymerization | Amount of hydrogen fed | l | | 1.0 | 0.5 |
| | Ethylene/total monomer (1) | Weight % | | 50 | 50 |
| | Polymerization time | min. | | 110 | 110 |
| Intrinsic viscosity (calculated value) | $[\eta]_1$ | dl/g | | 1.16 | 0.95 |
| | $[\eta]_2$ | " | | 16.0 | 18.8 |
| | $[\eta]_3$ | " | | 11.9 | 13.4 |
| Ethylene content in copolymer formed in each step (2) | Second step | Weight % | | 81 | 75 |
| | Third step | " | | 72 | 70 |
| Finally obtained copolymer | Weight ratio of polymers formed in each step | | | 86/2/12 | 84/2/14 |
| | Ethylene content in total polymer (2) | Weight % | | 10.2 | 11.3 |
| | MFR of total polymer (3) | g/10 min. | | 6.4 | 6.0 |
| | I I (23° C.) (5) | Kg . cm/cm² | | 11.5 | 12.0 |
| | I I (−20° C.) | " | | 7.5 | 8.2 |
| Values of physical properties | Brittle temperature (6) | °C. | | −13 | −16 |
| | Luster (7) | % | | 56 | 48 |
| | Hardness (8) | R-scale | | 92 | 91 |
| | Bending modulus (9) | ×10⁴Kg/cm² | | 1.25 | 1.25 |
| | Tensile strength (10) | Kg/cm² | | 280 | 275 |
| | Spiral flow (11) | mm | | 93 | 87 |

According to the results shown in Table 2, Comparative example 3-1' was inferior to Example 2 in the I I values (at 23° C. and −20° C.) and the brittle temperature. Comparative example 3-2' was inferior to Example 2 in the luster. Comparative example 4 was inferior to Example 3 in the I I value (at −20° C.) and the brittle temperature. Comparative example 5 was inferior to Example 1 in the I I value (at −20° C.), the brittle temperature and the luster.

EXAMPLE 4 and Comparative example 6

Copolymers were obtained under the same conditions as in Example 1 except that the ethylene contents in the copolymers prepared in the third step were varied. The results are shown in Table 3.

EXAMPLE 5 and Comparative example 7

Copolymers were obtained under the conditions as in Example 1 except that the ethylene contents in the finally obtained copolymers insoluble in the polymerization solvent were varied. The results are shown in Table 3.

EXAMPLE 6 and Comparative example 8

Copolymers were obtained under the same conditions as in Example 1 except that the calculated values $[\eta]_2$ of the intrinsic viscosities of the copolymers obtained in the second step were reduced, and the calculated values $[\eta]_3$ of the intrinsic viscosities of the copolymers obtained in the third step were increased. The results are shown in Table 3.

TABLE 3

| | | | Ethylene content in third step | | | | |
|---|---|---|---|---|---|---|---|
| | | | Example 4-1 | Example 4-2 | Example 4-3 | Comp. ex. 6-1' | Comp. ex. 6-2' |
| Second step copolymerization | Amount of hydrogen fed | l | 0 | 0 | 0 | 0 | 0.5 |
| | Ethylene/total monomer (1) | Weight % | 70 | 70 | 70 | 70 | 65 |
| | Pressure | Kg/cm² . G | 2 | 2 | 2 | 2 | 2 |
| | Polymerization time | min. | 10 | 10 | 10 | 10 | 15 |
| Third step copolymerization | Amount of hydrogen fed | l | 2.5 | 4.1 | 4.5 | 2.0 | 4.0 |
| | Ethylene/total monomer (1) | Weight % | 20 | 70 | 85 | 10 | 92 |
| | Pressure | Kg/cm² . G | 2 | 2 | 2 | 2 | 2 |
| | Polymerization time | min. | 110 | 110 | 105 | 110 | 105 |
| Intrinsic viscosity (calculated value) | $[\eta]_1$ | dl/g | 1.57 | 1.58 | 1.49 | 1.59 | 1.43 |
| | $[\eta]_2$ | " | 19.7 | 19.2 | 19.5 | 20.1 | 14.4 |
| | $[\eta]_3$ | " | 6.6 | 6.3 | 5.1 | 6.7 | 5.7 |
| Ethylene content in copolymer formed in each | Second step | Weight % | 81 | 82 | 82 | 83 | 76 |
| | Third step | " | 53 | 80 | 89 | 30 | 95 |

TABLE 3-continued

|  |  |  |  |  |  |  |  |
|---|---|---|---|---|---|---|---|
| step (2) |  |  |  |  |  |  |  |
| Finally obtained copolymer | Weight ratio of polymers formed in each step |  | 80/3/17 | 80/2/18 | 80/2/18 | 82/2/16 | 80/3/17 |
|  | Ethylene content in total polymer (2) | Weight % | 11.4 | 16.0 | 17.8 | 6.4 | 18.4 |
|  | MFR of total polymer (3) | g/10 min. | 6.6 | 6.8 | 7.7 | 6.6 | 6.3 |
|  | Soluble polymer (4) | Weight % | — | 3.1 |  | 8.1 | 4.2 |
|  | I I (23° C.) (5) | Kg . cm/cm² | 12.5 | 13.7 | 12.8 | 9.3 | 7.6 |
|  | I I (−20° C.) | " | 7.5 | 8.9 | 8.2 | 5.2 | 4.5 |
| Values of physical properties | Brittle temperature (6) | °C. | −14 | −23 | −18 | −2 | −5 |
|  | Luster (7) | % | 75 | 73 | 71 | 78 | 70 |
|  | Hardness (8) | R-scale | 89 | 91 | 93 | 88 | 93 |
|  | Bending modulus (9) | ×10⁴Kg/cm² | 1.15 | 1.20 | 1.25 | 1.15 | 1.25 |
|  | Tensile strength (10) | Kg/cm² | 275 | 280 | 285 | 270 | 285 |
|  | Spiral flow (11) | mm | 102 | 106 | 103 | 86 | 97 |

| | | | Ethylene content in total polymer | | | | |
|---|---|---|---|---|---|---|---|
| | | | Example 5-1 | Example 5-2 | Example 5-3 | Comp. ex. 7-1' | Comp. ex. 7-2' |
| Second step copolymerization | Amount of hydrogen fed | l | 0 | 0 | 0.5 | 0 | 0.5 |
|  | Ethylene/total monomer (1) | Weight % | 55 | 60 | 60 | 55 | 65 |
|  | Pressure | Kg/cm² . G | 10 | 3 | 2 | 1 | 2 |
|  | Polymerization time | min. | 10 | 10 | 10 | 5 | 20 |
| Third step copolymerization | Amount of hydrogen fed | l | 3.5 | 5.0 | 6.0 | 3.5 | 5.0 |
|  | Ethylene/total monomer (1) | Weight % | 45 | 45 | 70 | 45 | 47 |
|  | Pressure | Kg/cm² . G | 2 | 2 | 2 | 2 | 3 |
|  | Polymerization time | min. | 80 | 120 | 120 | 60 | 100 |
| Intrinsic viscosity (calculated value) | $[\eta]_1$ | dl/g | 1.63 | 1.52 | 1.57 | 1.75 | 1.22 |
|  | $[\eta]_2$ | " | 16.2 | 20.8 | 15.4 | 15.3 | 15.1 |
|  | $[\eta]_3$ | " | 7.6 | 4.5 | 5.2 | 7.4 | 4.6 |
| Ethylene content in copolymer formed in each step (2) | Second step | Weight % | 76 | 77 | 77 | 75 | 79 |
|  | Third step | " | 65 | 65 | 85 | 63 | 71 |
| Finally obtained copolymer | Weight ratio of polymers formed in each step |  | 91/1/7 | 79/3/18 | 77/3/20 | 94/0.5/5.5 | 67/5/28 |
|  | Ethylene content in total polymer (2) | Weight % | 5.4 | 14.0 | 19.3 | 3.8 | 23.8 |
|  | MFR of total polymer (3) | g/10 min. | 6.4 | 7.7 | 6.9 | 7.5 | 7.4 |
|  | Soluble polymer (4) | Weight % |  | 5.5 |  | 2.6 | 10.6 |
|  | I I (23° C.) (5) | kg . cm/cm² | 9.7 | 14.3 | 14.7 | 8.4 | 15.1 |
|  | I I (−20° C.) | " | 7.0 | 9.1 | 9.1 | 5.1 | 9.3 |
| Values of physical properties | Brittle temperature (6) | °C. | −8 | −27 | −25 | −1 | −31 |
|  | Luster (7) | % | 81 | 71 | 67 | 80 | 64 |
|  | Hardness (8) | R-scale | 94 | 86 | 83 | 95 | 81 |
|  | Bending modulus (9) | ×10⁴Kg/cm² | 1.30 | 1.15 | 1.15 | 1.30 | 1.0 |
|  | Tensile strength (10) | Kg/cm² | 290 | 265 | 260 | 295 | 245 |
|  | Spiral flow (11) | mm | 92 | 104 | 99 | 89 | 93 |

| | | | Low $\eta_2$/high $\eta_3$ | | |
|---|---|---|---|---|---|
| | | | Example 6-1 | Example 6-2 | Comp. ex. 8 |
| Second step copolymerization | Amount of hydrogen fed | l | 3.5 | 2.6 | 3.5 |
|  | Ethylene/total monomer (1) | Weight % | 45 | 45 | 45 |
|  | Pressure | Kg/cm² . G | 2 | 2 | 2 |
|  | Polymerization time | min. | 110 | 110 | 110 |
| Third step copolymerization | Amount of hydrogen fed | l | 0 | 0.2 | 3.5 |
|  | Ethylene/total monomer (1) | Weight % | 70 | 70 | 70 |
|  | Pressure | Kg/cm² . G | 3 | 2 | 2 |
|  | Polymerization time | min. | 7 | 10 | 10 |
| Intrinsic viscosity (calculated value) | $[\eta]_1$ | dl/g | 1.64 | 1.62 | 1.43 |
|  | $[\eta]_2$ | " | 7.6 | 9.0 | 6.6 |
|  | $[\eta]_3$ | " | 19.5 | 16.5 | 8.5 |
| Ethylene content in copolymer formed in each step (2) | Second step | Weight % | 64 | 66 | 64 |
|  | Third step | " | 81 | 80 | 83 |
| Finally obtained copolymer | Weight ratio of polymers formed in each step |  | 83/15/2 | 84/14/2 | 84/14/2 |
|  | Ethylene conent in total polymer (2) | Weight % | 11.2 | 10.8 | 10.6 |
|  | MFR of total polymer (3) | g/10 min. | 7.2 | 6.3 | 6.9 |
|  | Soluble polymer (4) | Weight % | 4.7 | 4.3 | 5.8 |
|  | I I (23° C.) (5) | Kg . cm/cm² | 11.5 | 10.9 | 10.3 |
|  | I I (−20° C.) | " | 7.2 | 6.8 | 5.4 |
| Values of physical properties | Brittle temperature (6) | 20°C. | −11 | −8 | −2 |
|  | Luster (7) | % | 77 | 79 | 76 |
|  | Hardness (8) | R-scale | 93 | 94 | 94 |
|  | Bending modulus (9) | ×10⁴Kg/cm² | 1.25 | 1.25 | 1.25 |
|  | Tensile strength (10) | Kg/cm² | 285 | 285 | 285 |

| | | TABLE 3-continued | | | |
|---|---|---|---|---|---|
| | Spiral flow (11) | mm | 99 | 95 | 87 |

According to the results shown in Table 3, Comparative example 6 was inferior to Example 4 in the I I values (at 23° C. and −20° C.) and the brittle temperature. Comparative example 7-1′ was inferior to Example 5 in the I I value (at 23° C.) and the brittle temperature.

ylaluminum chloride to give a solid component which was then treated with a hexane solution of diisoamyl ether and then reacted with titanium tetrachloride on heating, followed by separation and drying. The results are shown in Table 4.

TABLE 4

| | | | Al(Et)$_3$ | | TiCl$_3$ | |
|---|---|---|---|---|---|---|
| | | | Example 7 | Comp. ex. 9 | Example 8 | Comp. ex. 10 |
| Second step copolymerization | Amount of hydrogen fed | l | 0 | 2.5 | 0 | 2.5 |
| | Ethylene/total monomer (1) | Weight % | 75 | 70 | 70 | 70 |
| | Pressure | Kg/cm$^2$ . G | 1.5 | 1.5 | 1.5 | 1.5 |
| | Polymerization time | min. | 5 | 5 | 5 | 5 |
| Third step copolymerization | Amount of hydrogen fed | l | 4.0 | 2.5 | 4.0 | 2.5 |
| | Ethylene/total monomer (1) | Weight % | 45 | 45 | 45 | 45 |
| | Pressure | Kg/cm$^2$ . G | 1.5 | 1.5 | 1.5 | 1.5 |
| | Polymerization time | min. | 60 | 60 | 60 | 60 |
| Intrinsic viscosity (calculated value) | $[\eta]_1$ | dl/g | 1.40 | 1.65 | 1.47 | 1.69 |
| | $[\eta]_2$ | " | 17.8 | 9.4 | 18.3 | 9.5 |
| | $[\eta]_3$ | " | 6.3 | 6.0 | 5.8 | 5.9 |
| Ethylene content in copolymer formed in each step (2) | Second step | Weight % | 80 | 82 | 79 | 80 |
| | Third step | " | 68 | 71 | 67 | 69 |
| Finally obtained copolymer | Weight ratio of polymers formed in each step | | 85/2.5/12.5 | 84/3/13 | 85/3/12 | 85/3/12 |
| | Ethylene content in total polymer (2) | Weight % | 10.5 | 11.7 | 10.4 | 10.7 |
| | MFR of total polymer (3) | g/10 min. | 5.6 | 6.4 | 5.9 | 6.3 |
| | Soluble polymer (4) | Weight % | 4.5 | 5.9 | 3.8 | 4.7 |
| | I I (23° C.) (5) | Kg . cm/cm$^2$ | 13.0 | 11.6 | 12.4 | 11.3 |
| | I I (−20° C.) | " | 7.7 | 6.2 | 7.9 | 6.1 |
| Values of physical properties | Brittle temperature (6) | °C. | −16 | −8 | −17 | −6 |
| | Luster (7) | % | 80 | 63 | 76 | 61 |
| | Hardness (8) | R-scale | 91 | 92 | 94 | 94 |
| | Bending modulus (9) | ×10$^4$Kg/cm$^2$ | 1.25 | 1.25 | 1.30 | 1.30 |
| | Tensile strength (10) | Kg/cm$^2$ | 285 | 285 | 290 | 290 |
| | Spiral flow (11) | mm | 108 | 91 | 104 | 87 |

Comparative example 7-2′ was inferior to Example 5 in the luster and the bending modulus. Example 6 and Comparative example 8 had higher brittle temperatures.

EXAMPLE 7 and Comparative example 9 ($\eta_2$, lower)

Copolymers were obtained under the same conditions as in Example 1 except that, in the second step ethylene-propylene copolymerization, triethylaluminum (1.9 g) was added just prior to feeding the gas mixture of propylene with ethylene (or just prior to feeding a small amount of hydrogen gas when the hydrogen gas is added). The results are shown in Table 4. In such a case, the activity of the polymerization catalyst at the time of the second and third step copolymerizations was improved, although the various physical properties of the resulting copolymers and the amount of soluble polymer formed were almost the same as those in the case of no addition of triethylaluminum.

The above-mentioned improvement in the catalyst activity is confirmed by the reduced values of the polymerization pressure and time in the second and third step polymerizations shown in Table 4.

EXAMPLE 8 and Comparative example 9 ($\eta_2$, lower)

Copolymers were obtained under the same conditions as in Example 1 except that the titanium trichloride composition as a component of the polymerization catalyst of Example 1 was replaced by the one (2.5 g) obtained by reducing titanium tetrachloride with dieth-

What is claimed is:

1. In a process for producing a modified polypropylene having an ethylene content of 5 to 20% by weight, by copolymerizing propylene with ethylene in the presence of a stereospecific catalyst comprising an organoaluminum compound component and a transition metal halide component,
the improvement of the process which comprises
a first step of carrying out polymerization so as to give a propylene polymer corresponding to 75 to 90% by weight based on the weight of a final modified polypropylene and having an ethylene content of 2% by weight or less;
a second step of preparing an ethylene-propylene random copolymer (A) having an intrinsic viscosity of 12 dl/g or higher as measured in tetralin at 135° C. and an ethylene content of 50 to 95% by weight; and
a third step of preparing an ethylene-propylene random copolymer (B) having an intrinsic viscosity of 9.5 dl/g or lower as measured in tetralin at 135° C. which is different from that of said ethylene-propylene random copolymer (A) and an ethylene content of 40 to 90% by weight,
the proportion of said ethylene-propylene random copolymer (A) in the total amount of said ethylene-propylene random copolymers (A) and (B) being adjusted to 4 to 30% by weight and the first step being carried out always at first but the order of the second step and the third step being interexchangeable.

2. The improvement according to claim 1 wherein said ethylene-propylene random copolymer (B) has an intrinsic viscosity of 9.0 dl/g or lower as measured in tetralin at 135° C.

3. The improvement according to claim 1 wherein said ethylene-propylene random copolymer (A) has an ethylene content of 70 to 90% by weight.

4. The improvement according to claim 1 said ethylene-propylene random copolymer (B) has an ethylene content of 50–85% by weight.

5. The improvement according to claim 1 wherein said finally obtained modified polypropylene has an ethylene content of 8 to 15% by weight.

* * * * *